(12) United States Patent
Gao et al.

(10) Patent No.: US 8,306,124 B2
(45) Date of Patent: Nov. 6, 2012

(54) ENCODING METHOD FOR SKIPPED MACROBLOCKS IN VIDEO IMAGE

(75) Inventors: Wen Gao, Beijing (CN); Junhao Zheng, Beijing (CN); Siwei Ma, Beijing (CN); Xiangyang Ji, Beijing (CN); Peng Zhang, Beijing (CN); Yan Lu, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 1472 days.

(21) Appl. No.: 10/584,844

(22) PCT Filed: Jul. 8, 2004

(86) PCT No.: PCT/CN2004/000771
§ 371 (c)(1),
(2), (4) Date: Jun. 28, 2006

(87) PCT Pub. No.: WO2005/067304
PCT Pub. Date: Jul. 21, 2005

(65) Prior Publication Data
US 2007/0217500 A1    Sep. 20, 2007

(30) Foreign Application Priority Data
Dec. 31, 2003    (CN) .......................... 2003 1 0116088

(51) Int. Cl.
*H04N 7/12*    (2006.01)
(52) U.S. Cl. ................................................. 375/240.23
(58) Field of Classification Search ............... 375/240.23
See application file for complete search history.

(56) References Cited

U.S. PATENT DOCUMENTS

| | | | |
|---|---|---|---|
| 5,552,832 A | 9/1996 | Astle | |
| 6,031,937 A | 2/2000 | Graffagnino | |
| 6,192,148 B1 | 2/2001 | Lin | |
| 6,792,046 B2 * | 9/2004 | Hatano et al. ............ | 375/240.24 |
| 6,859,500 B2 | 2/2005 | Fröjdh et al. | |
| 2002/0136306 A1 * | 9/2002 | Frojdh et al. ............ | 375/240.23 |
| 2003/0113026 A1 * | 6/2003 | Srinivasan et al. ............ | 382/239 |
| 2004/0146105 A1 * | 7/2004 | Hagai et al. ............ | 375/240.12 |

FOREIGN PATENT DOCUMENTS

| | | |
|---|---|---|
| CN | 1498503 | 5/2004 |
| WO | WO 02/076104 A2 | 9/2002 |

* cited by examiner

*Primary Examiner* — Jay Au Patel
*Assistant Examiner* — Richard Torrente
(74) *Attorney, Agent, or Firm* — J.C. Patents

(57) ABSTRACT

An encoding method for skipped macroblocks in a video image includes the steps of: adding one indication bit into a picture header for indicating a coding mode for skipped macroblocks in a current image; selecting the coding mode for a macroblock type in the current image according to the number of skipped macroblocks, if it is a run_length coding, then setting the indication bit of the picture header as a status indicating a run_length coding, and encoding the macroblock type in the image by the run_length coding mode; if it is a joint coding, then setting the indication bit of the picture header as status indicating a joint coding and encoding the macroblock type in the image by the joint coding mode of the number of skipped macroblocks and the macroblock type; finally, encoding other data in the current macroblock and writing data into a code stream.

6 Claims, 4 Drawing Sheets

ENCODING METHOD FOR SKIPPED MACROBLOCKS IN VIDEO IMAGE

FIELD OF THE INVENTION

The present invention relates to an encoding method for macro blocks in a video image, and more particularly, to an encoding method for the skipped macroblocks in a video image if the encoding image includes the skipped macroblocks, which belongs to the video coding field.

BACKGROUND OF THE INVENTION

Generic technology of the high technology industries such as digital television, new generation mobile communications, broadband communications network and family consumer electronics focuses on multimedia of which the main content is video and audio processing technology, particularly on the data compressing technology. High efficient video encoding/decoding technology is the key of realizing high quality and low cost for storing and transmitting multimedia data.

In the existing video standards (such as MPEG series and H.26x series), there is a mode of skipped macroblock. So-called skipped macroblock means that it is not necessary to encode the additional information (for example, motion vector or residual) when encoding such kind of macroblocks, and it only exists in P-frame image and B-frame image, i.e. only existing in inter-frame encoding video images and not in intra-frame encoding video images like I-frame. The motion vector of the skipped macroblock is deducted by the motion vector of the adjacent pre-processed macroblocks (in time domain or space domain) without any residual data (the residual is 0 after quantization). Since processing the skipped macroblock is different from that of other macroblocks, it should be indicated while video encoding.

In MPEG 2 standard, the skipped macroblock is processed by "macroblock_address_increment". If the "macroblock_address_increment" is larger than 1, it means that there are several skipped macroblocks.

In H.263 standard, a special bit is employed to indicate if there is a datum to be coded, i.e. "coded macroblock indication", and 1 means no datum is the skipped macroblock while 0 means there is coded macroblock behind.

In H.264 standard, "run_length" code is employed to process the skipped macroblock and to code the number of skipped macroblocks. Such kind of processing method has the same theory of encoding the number of skipped macroblocks as the method of "macroblock_address_increment" in MPEG 2.

In the present technologies, the code efficiency is low only by using a single method to encode the skipped macroblock. For some flat sequences, there are many skipped macroblocks when the quantized parameters are a little larger, and at the meantime the "macroblock indication mode" needs one bit for each macroblock to indicate whether to skip the macroblock, which is low efficient; however, using "macroblock_address_increment" mode only needs variable_length code to encode the number of continuous skipped macroblocks. In the same way, for some sequences with big motion, the skipped macroblocks are fewer and the numbers of continuously appeared skipped macroblocks is also smaller when the quantized parameters are small, and the frequently appeared smaller numeral values are unfavorable to the variable_length code for encoding. For example, when using the variable_length code with the numeral value 3 to encode, it might need 3 bits to indicate, and if there are many such kind of small numeral values but no big numeral value (skipped macroblocks continuously appear), at the mean time, the fixed-length code can realize better encoding result. At the same time, for the single value 0 for indicating the non skipped macroblocks, the actual encoding bits of the "macroblock_address_increment" mode and the "coded macroblock indication" mode are the same. Meanwhile, the macroblock_address_increment mode can not take sufficient advantage of the variable_length code, and the encoding efficiency is also greatly lowered.

Selecting what kind of mode to encode the skipped macroblock in image encoding to gain the best encoding efficiency has become one of the difficulties to further improve the encoding efficiency in the video encoding field.

SUMMARY OF THE INVENTION

The present invention provides an encoding method for skipped macroblocks, which can select different encoding modes to encode the skipped macroblocks according to the number of skipped macroblocks so as to improve the encoding efficiency.

An encoding method for skipped macroblocks in video image, comprises the steps of:

step 1, adding one indication bit into a picture header for indicating a coding mode for skipped macroblocks in a current image;

step 2, selecting the coding mode for a macroblock type in the current image according to the number of skipped macroblocks, if it is a run_length coding, then proceeding to step 3; if it is a joint coding of the number of skipped macroblocks and the macroblock type, then proceeding to step 4;

step 3, encoding the macroblock type in the image by the run_length coding mode; then proceeding to step 5;

step 4, encoding the macroblock type in the image by the joint coding mode of the number of skipped macroblocks and the macroblock type; then proceeding to step 5;

step 5, encoding the current image and writing data into a code stream.

The present invention selects the encoding method for skipped macroblocks in video image through twice coding or the Threshold, which improves the image encoding efficiency, reduces the cost for transmission and storage, solves the problem of low efficiency in the former encoding skipped macroblock in video image, and has high applicability to be used validly in frame encoding and field encoding. Therefore it is a simple and practical technical solution.

DETAILED DESCRIPTION OF THE PREFERRED EMBODIMENTS

Video image consists of multiple macroblocks. Therefore encoding the video image should firstly encode the macroblock types, and then code the macroblock itself; image encoding is accomplished after all the macroblocks are coded.

The present invention relates to encoding the macroblock types in the inter frame codedvideo image. The skipped macroblock can be regarded as a kind of special macroblock type, and encoding the macroblock itself such as the data of motion vector, residual and others can use any kind of macroblock encoding mode.

In the present invention, according to the code rate, requirement for the image quality and the characteristic of video sequence, run_length code can be employed for encoding image with a lot of skipped macroblocks, and the joint coding mode of the number of skipped macroblocks and the macroblock types can be employed for encoding image with few skipped macroblocks so as to better suit the demands of different applications. The most efficient method for encoding skipped macroblocks is selected in various circumstances, which can improve the encoding efficiency.

Figure 1:
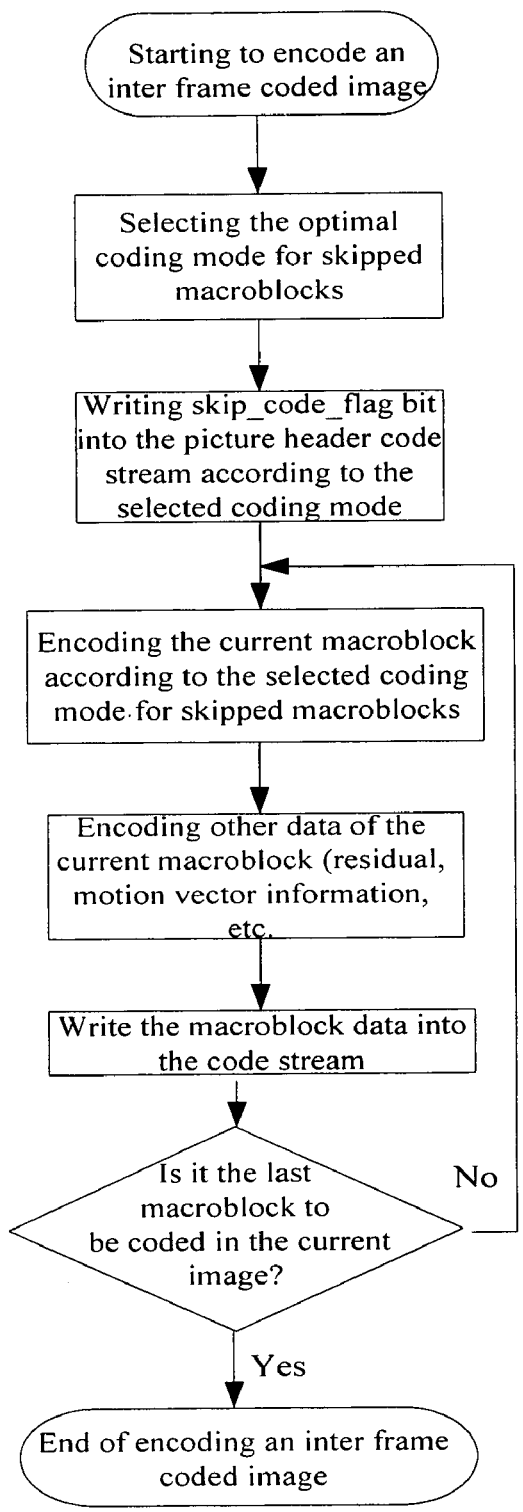
FIG. 1 is a diagrammatic sketch of the general encoding procedure of embedding the skipped macroblock encoding of the present invention.

As shown in FIG. 1, the encoding procedure of the technical solution in the present invention includes the following steps of:

step 1, adding one indication bit in a picture header for indicating a coding mode for the skipped macroblocks in a current image;

step 2, selecting a coding mode for a macroblock type in the current image according to the number of skipped macroblocks, if it is a run_length code, then proceeding to step 3; if it is a joint coding of the number of skipped macroblocks and the macroblock type, then proceeding to step 4 of the;

step 3, setting the indication bit of the picture header as a status indicating a run_length code, and encoding the macroblock type of the image by the run_length coding mode; then proceeding to step 5;

step 4, setting the indication bit of the picture header as a status indicating a joint coding, and encoding the macroblock type of the image by the joint coding mode by combing the number of skipped macroblocks and the macroblock type; then proceeding to step 5;

step 5, encoding the current image and writing into a code stream.

Since different coding modes are employed for the skipped macroblocks in video image in the present invention, flagging method should be primarily changed. In order to decrease the fladgs, all the skipped macroblocks in a single frame employ identical method to encode. The picture header includes many pictures' information, and adding one bit (0 or 1) in the picture header which can indicate the coding mode for the skipped macroblocks in the current image. For instance, preset that it means run_length code when said bit is 1, and joint code of the number of skipped macroblocks and the macroblock types when said bit is 0.

The below is one embodiment of the programming written by the programming design language used in the present invention:

| pb_picture_header( ) | //picture header |
|---|---|
| { | |
| .................... | |
| skip_code_flag | //the value shows the coding mode for skipped macroblocks |
| .................... | |
| next_start code( ) | //find out the next picture header of the code stream |
| } | |

Here, pb_picture_header ( ) is used for introducing one bit datum into the picture header, for indicating a coding mode for skipped macroblocks in a current image. It is realized by: the length of skip_code_flag is one bit, it means the coding mode is a run_length code when said bit is 1, and the coding mode is a joint code of the number of skipped macroblocks and the macroblock type when said bit is 0.

After encoding the macroblock type, it involves in encoding the data of the macroblock itself, i.e. coding the data such as motion vector and residual, etc., and then write the data into the code stream to accomplish encoding of the current macroblock; encode all the macroblocks in the current image orderly to accomplish encoding the current image; encode all the inter frame coded video images by the above-mentioned method.

Figure 2:
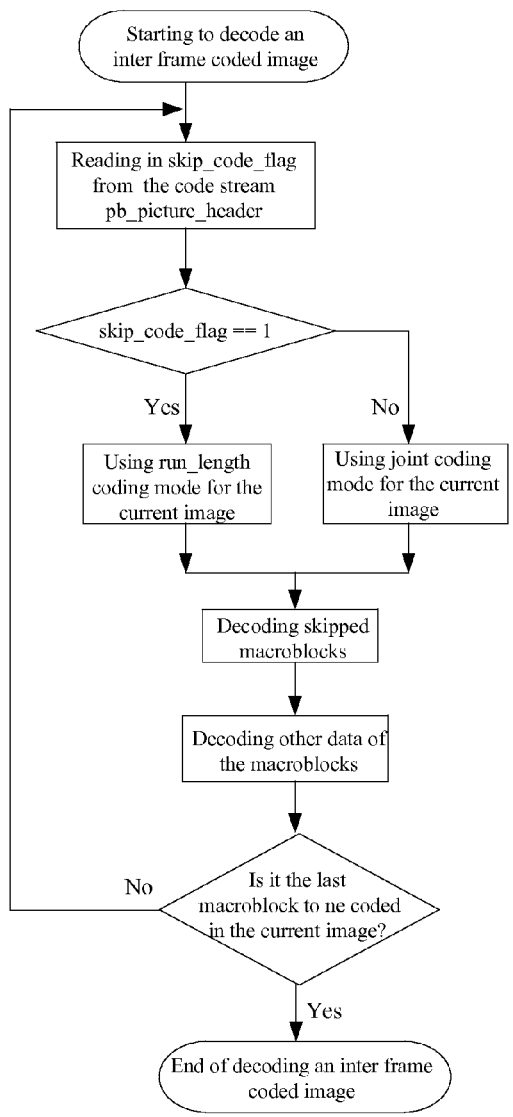
FIG. 2 is a diagrammatic sketch of the general decoding procedure of embedding the skipped macroblock decoding of the present invention.

The decoding end is as shown in FIG. 2. At first, read in the skipped macroblock code flag from the picture header of the code stream, judge the value of the flag. If the value is 1, it is a run_length code and if the value is 0, it is a joint code; after then accomplish decoding the macroblock by using the corresponding method.

It can be figured out in accordance with the above descriptions that step 2 in the present invention of selecting the coding mode of the macroblock type in the current image is one key point of the present invention. There are two methods, one is choosing the optimal one by employing twice encoding to compare the coding performance, and the other method is determining the coding mode by estimating the number of the image skipped macroblocks to be coded through statistical way.

Figure 3:
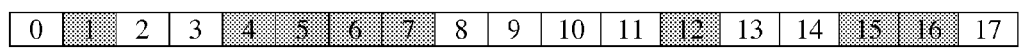
FIG. 3 is a diagrammatic sketch of an embodiment of the image macroblock including the skipped macroblock.

What is shown in FIG. 3 is a part of the inter frame coded video image including the skipped macroblock to be an example of detailed description of the technical solution of the present invention.

Figure 4:
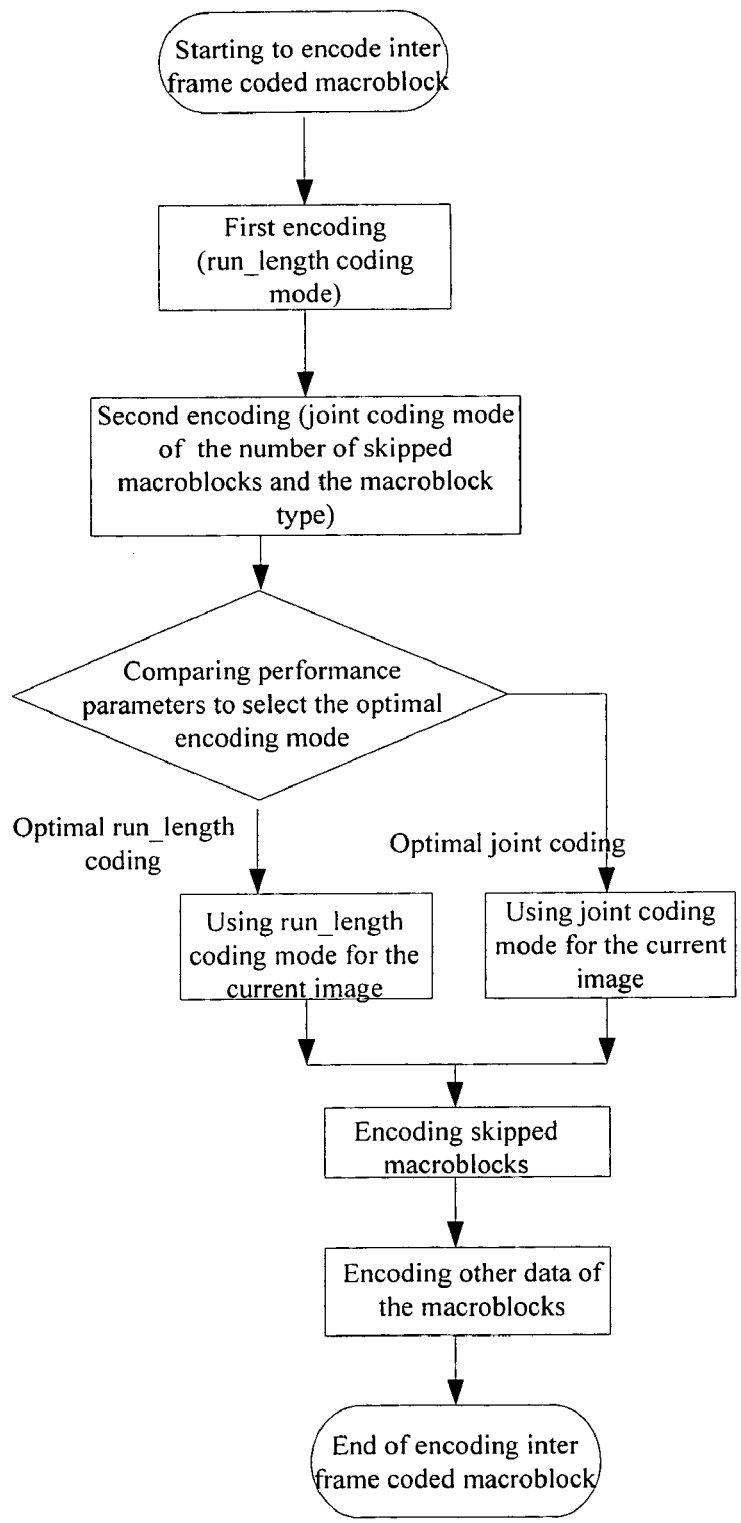
FIG. 4 is a flow chart of selecting encoding mode by adopting the twice encoding in the present invention.

FIG. 4 is the coding mode for the skipped macroblock in the single frame image to select the optimal solution by adopting twice encoding with the following steps:

step 200, employing the run_length code mode for all the macroblocks in the current image to be coded, and obtaining corresponding coding performance parameters after processing;

step 201, secondly encoding the current image to be coded, employing the joint coding mode of the number of skipped macroblocks and the macroblock type for all the macroblocks, and obtaining corresponding coding performance parameters after above processing;

step 202, comparing the performance parameters obtained from the twice encoding, and selecting an optimal coding mode for the skipped macroblocks in the current image.

The performance parameters to be compared comprise coding rate and signal-to-noise ratio. Said coding rate indicates coding efficiency, that is to say, the compression ratio, and said signal-to-noise ratio indicates the distortion condition after being compressed. To select which parameter as the judging basis should be determined by the requirement of encoding. If the requirement for the image compression ratio is high but the requirement for image distortion is not high, a coding mode with high coding rate of the same signal-to-noise ratio can be selected; If the requirement for image distortion is high but the requirement for the image compressing rate is not high, a coding mode with low distortion rate of the same compression ratio can be selected. Because encoding the skipped macroblocks has little effect on the quality of coding image, i.e. little effect on signal-to-noise ratio, the code mode influences the coding rate at this time.

Now, the introduction to the two kinds of coding modes is given as the following:

The run_length coding mode is using the variable_length coding (VLC) to encode the number of the skipped ones for the continuous skipped macroblocks; and one bit "0" must be added and coded between the continuous non-skipped macroblocks for indicating there is no skipped macroblock. Hence, each non-skipped macroblock among the code stream is coded according to the structure shown in table 1. Firstly encode the skipped macroblock counter in each macroblock header, and then encode the next mb-type (macroblock type) of the non-skipped macroblock. Such kind of mode has no effect on the former encoding of macroblock type. Vaviable_length_coding (for example: Exp-Golomb) coding mode is employed for encoding the number of the skipped macroblocks.

TABLE 1

Run_length coding coding mode for the skipped macroblocks

| skipped macroblock counter | mb_type |
|---|---|

For instance, what is shown in FIG. 3 is the macroblock type of the image to be coded; each small lattice indicates one macroblock, and darke color ones are the skipped macroblocks. Using the run_length coding processing method (mbx indicates the coding data of No. X macroblock), the result is:

(0, $mb_0$) (1,$mb_2$) (0,$mb_3$) (4,$mb_8$) (0,$mb_9$) (0,$mb_{10}$) (0, $mb_{11}$) (1,$mb_{13}$) (0,$mb_{14}$) (2,$mb_{17}$)

The joint coding mode combing the number of skipped macroblocks and the macroblock type processes P frame image according to the following method: if it is P frame image, adding a kind of skip mode in the macroblock type, and its position in the macroblock type table is determined according to its average appearance probability, and the whole macroblock type table should be adjusted correspondingly. The appearance probability of the skip macroblock type is variable according to the difference of the images, and the possible appearance probability can be judged by pre-counting the image of a certain type, therefore to determine the position of the skip macroblock type in the macroblock type table. Generally the appearance probability of the skip macroblock type for the B frame image and the P frame image is high, the mb_type thereof can be set as 0.

For instance, what is shown in table 2 is the macroblock type table of the former P frame image.

TABLE 2 macroblock type of the P frame image:

| mb_type | name of mb_type | num_mb_part | mb_part_pred_mode |
|---|---|---|---|
| 0 | P_L0_16 × 16 | 1 | Pred_L0 |
| 1 | P_L0_L0_16 × 8 | 2 | Pred_L0 |
| 2 | P_L0_L0_8 × 16 | 2 | Pred_L0 |
| 3 | P_8 × 8 | 4 | na |
| 4 | P_8 × 8ref0 | 4 | na |
| 5 | I_8 × 8 | Intra_8 × 8 | na |

What is shown in table 3 is the: macroblock type table of the P frame image with the additional P_Skip mode. Insert the P_Skip mode in the first item of the table, and other former items are pushed backward in order. The macroblock type employs the Exp_Golomb coding mode.

TABLE 3 macroblock type of the P frame image adding P_Skip mode

| mb_type | name of mb_type | num_mb_part | mb_part_pred_mode |
|---|---|---|---|
| 0 | P_Skip_16 × 16 | 1 | na |
| 1 | P_L0_16 × 16 | 1 | Pred_L0 |
| 2 | P_L0_L0_16 × 8 | 2 | Pred_L0 |
| 3 | P_L0_L0_8 × 16 | 2 | Pred_L0 |
| 4 | P_8 × 8 | 4 | na |
| 5 | P_8 × 8ref0 | 4 | na |
| 6 | I_8 × 8 | Intra_8 × 8 | na |

For the continuous skipped macroblocks, respectively encode each flag by the skip type according to the skipped counter. For the non-skipped macroblocks, they can be indicated by using the corresponding macroblock type coding. Therefore the skipped macroblocks and the non-skipped macroblocks can be clearly distinguished according to the macroblock type.

Encode the image shown in FIG. 3 by using the joint coding mode, and the result is: (TYPE-$mb_0$,$mb_0$) (0) (TYPE-$mb_2$, $mb_2$) (TYPE-$mb_3$,$mb_3$) (0) (0) (0) (0) (TYPE-$mb_8$,$mb_8$) (TYPE-$mb_9$,$mb_9$) (TYPE-$mb_{10}$,$mb_{10}$) (TYPE-$mb_{11}$,$mb_{11}$) (0) (TYPE-$mb_{13}$,$mb_{13}$) (TYPE-$mb_{14}$,$mb_{14}$) (0) (0) (TYPE-$mb_{17}$,$mb_{17}$).

Here, mbx means coding data unit of No. x macroblock, TYPE-mbx means the type of No. x macroblock.

Processing B frame image by the joint coding mode of the number of the skipped macroblocks and the macroblock type can adopt two methods: one is using the processing method identical to the method of processing P frame image, add to the former macroblock type table, here the unnecessary details will not be given; the second method is adjusting the encoding by the former direct mode for B frame images (B_Direct16×16 mode) to reach the same effect.

Considering that there are a lot of macroblock types in B frame image, modifying the former macroblock type table has great effect on non-skipped macroblock coding. Here, the two macroblock types of Direct and Skipped Mode are indicated by the former B frame image direct mode, and they are further distinguished by Coded Block Pattern (CBP). The Direct mode does not need to encode the information of motion vector. The motion vector is gained by deduction, which is the same with the Skip mode, but it can have the residual data. The Skip mode can be regarded as a special state of Direct mode, i.e. it is a Direct mode with the residual data being 0. CBP indicates which 8×8 block has the residual data. If all the residual data of the current macroblock are 0, the CBP is also 0.

The coding mode for each skipped macroblock is using the Direct mode coding value closely followed by the CBP coding value with the coding value of zero (the skipped macroblock has no residual data originally so that CBP must be 0), and the coding mode for the Direct macroblock is using the Direct mode coding value closely followed by the CBP non-zero coding value, and other non-skipped macroblocks are encoded in accordance with the corresponding macroblock types. In this way, the Direct and the Skipped coding modes can be distinguished by the assistance of CBP without modifying the former macroblock type table, therefore there is no effect on other macroblock coding modes. The detailed encoding is shown as table 4:

TABLE 4

| Direct + CBP mode | |
| --- | --- |
| Direct mode Coding value | CBP Coding value |

When decoding, through the read in macroblock type, if it is the Direct mode, the followed CBP value should be read in. If CBP is 0, the current macroblock is the skipped macroblock, and the followed datum is the next macroblock; if the CBP is not 0, the current macroblock is a real Direct macroblock, and the followed datum is the residual datum of the current block.

Because the speed of selecting the optimal coding mode for the skipped macroblock by twice encoding is very slow, a kind of adaptive mode can be employed to select the coding method rapidly.

Figure 5:
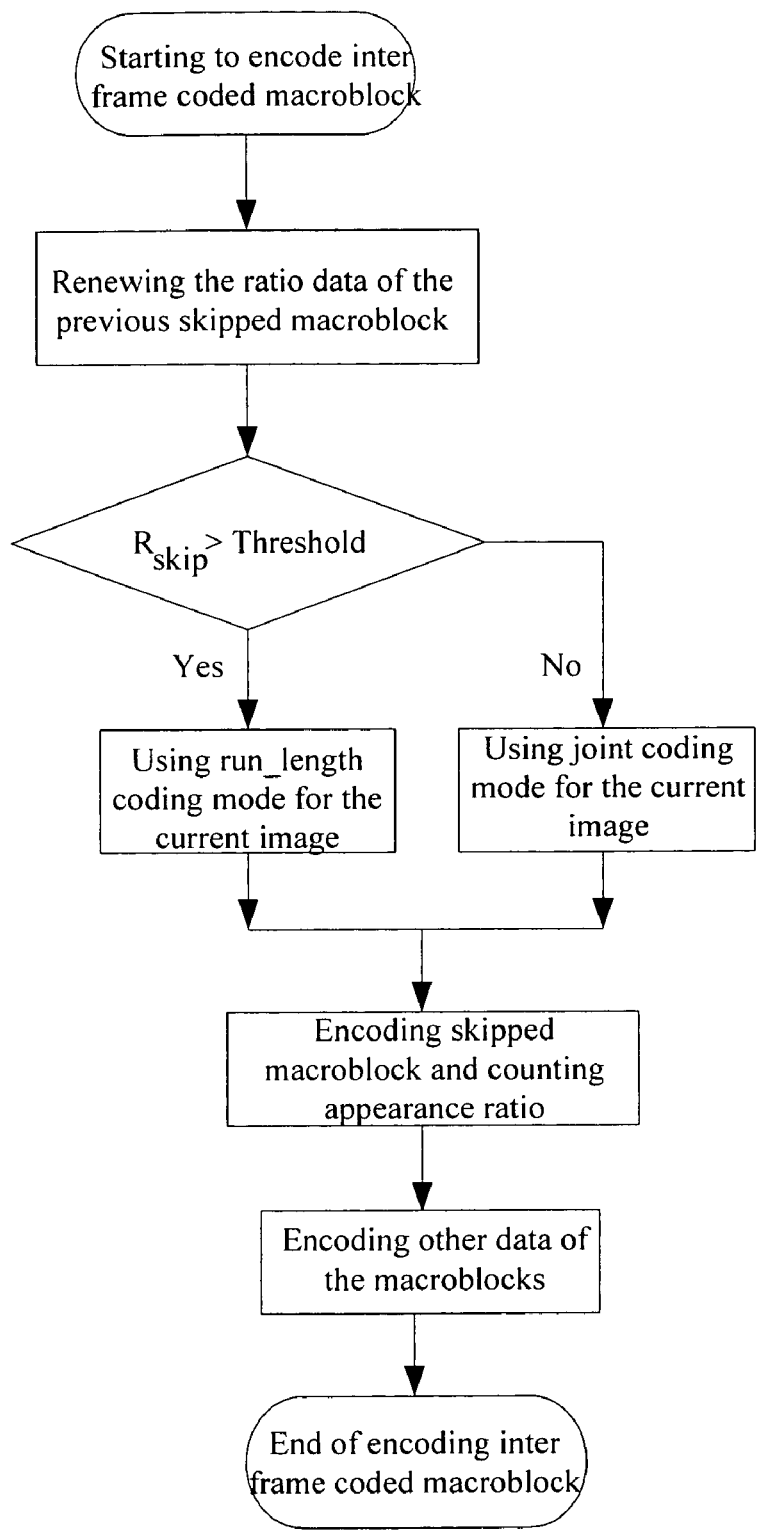
FIG. 5 is a flow chart of selecting encoding mode based on the statistical information in the present invention.

As shown in FIG. 5, The ratio of the skipped macroblock (Rskip) in the current frame is counted in each encoding. Before encoding the next frame, the Rskip of the next frame can be predicted according to the relativity of the video sequence contents by referring to the statistical information of the previous frame. If it is larger than the Threshold, the numbers of the skipped macroblocks in the next frame are more, so the run_length coding mode is employed at this moment; if it is less than the Threshold, the numbers of the skipped macroblock are few, so the joint coding mode of the number of the skipped macroblocks and the macroblock type is employed.

Threshold selection relates to the quantized parameter (QP), different QP value adopts different Thresholds. QP can approximately control the quality of the coded image. When the QP is larger, the image quality becomes worse, the code rate is reduced, the compression ratio is increased, and the appearance rate of the skipped macroblock is increased.

Since different image comprises different numbers of macroblocks (for example, the number of macroblocks in high definition image is large), the Threshold varies a lot, the changing scope is usually between 35-55%; In order to obtain the optimal coding efficiency, statistical method can be employed to compare the effects of the two kinds of coding modes, and the Threshold of the present invention is obtained according to the statistical result. Because in most circumstances, there are a lot of useful resources for encoding, pre-select certain representative code streams for the practical application demands, count the distribution features of the skipped macroblocks of the typical code streams under such kinds of application demands according to the above said twice encoding method so as to obtain the optimal Threshold adaptive for the current application. Another method is encoding multiple frames of inter frame coded image by twice encoding method at the beginning of encoding by using the software and counting the distribution feature of the corresponding skipped macroblock to obtain the experienced Threshold of the current sequence, then all the followed sequences are encoded by the selection method of fast mode.

For instance, when adopting the adaptive fast algorithm, if QP is 37, there are 3600 macroblocks in each image for the high definition sequence (1280×720), so use the run_length coding mode to encode the skipped macroblocks in the current frame if the total number of the skipped macroblocks in the previous image is over 1440; otherwise, use the joint coding mode. There are 396 macroblocks in each image for the CIF sequence (352×288), so use the run_length coding mode if the number of the skipped macroblocks in the previous image is over 198; otherwise, use the joint coding mode.

Using the adaptive encoding method basing on statistics does not increase the space complexity, and the newly added computation in time complexity is also very little. And because of the time domain relativity of the images, such kind of estimation can obtain good coding effect under most circumstances.

It can be known by analysing the technical solution of the present invention that said method has little modification about the traditional video encoding/decoding processes, can be effectively used for both the frame coding and the field coding, and be easily inserted into the traditional frame/field coding processes.

It will be understood that the above embodiments are used only to explain but not to limit the present invention. In despite of the detailed description of the present invention with referring to above preferred embodiments, it should be understood that various modifications, changes or equivalents can be made by those skilled in the art without departing from the spirit and scope of the present invention.

What is claimed is:

1. An encoding method used by a digital television, new generation mobile communication apparatus, broadband communications network apparatus or family consumer electronics apparatus for skipped macroblocks in a video image, characterized in that it comprises the steps of:

step 1, adding one indication bit into a picture header for indicating a coding mode for skipped macroblocks in a current image;

step 2, selecting a run_length coding mode or a joint coding mode of the number of skipped macroblocks and the macroblock types for a macroblock type in the current image according to the number of skipped macroblocks, wherein the run_length coding mode is employed for the current image with a plurality of skipped macroblock, and the joint coding mode is employed for the current image with few skipped macroblocks, wherein the run_length coding mode is to employ a variable_length coding to encode the number of skipped macroblocks for continuous skipped macroblocks; and add one indication bit between continuous non-skipped macroblocks to indicate that the number of skipped macroblocks is 0, wherein selecting a run_length coding mode or a joint coding mode of the number of skipped macroblocks and the macroblock types for a macroblock type in the current image is through a twice encoding procedure comprising the particular steps of:

step 200, employing the run_length coding mode for all the macroblocks in the current image to be coded, and obtaining corresponding coding performance parameters after above processing;

step 201, secondly encoding the current image to be coded, employing the joint coding mode of the number of skipped macroblocks and the macroblock type for all the macroblocks, and obtaining corresponding coding performance parameters after above processing;

step 202, comparing the performance parameters obtained from the twice encoding, and selecting an optimal coding mode for the skipped macroblocks in the current image, if it is the run_length coding mode, then proceeding to step 3; if it is the joint coding mode of the number of skipped macroblocks and the macroblock type, then proceeding to step 4;

step 3, setting the indication bit of the picture header as a status indicating a run_length coding, and encoding the macroblock type in the image by the run_length coding mode; then proceeding to step 5;

step 4, setting the indication bit of the picture header as status indicating a joint coding and encoding the macroblock type in the image by the joint coding mode of the number of skipped macroblocks and the macroblock type; then proceeding to step 5;

step 5, encoding the current image and writing data into a code stream.

2. The encoding method used by a digital television, new generation mobile communication apparatus, broadband communications network apparatus or family consumer electronics apparatus for skipped macroblocks in a video image of claim 1, wherein the indication bit added in step 1 is for all the picture headers of the pictures to be coded.

3. The encoding method used by a digital television, new generation mobile communication apparatus, broadband communications network apparatus or family consumer electronics apparatus for skipped macroblocks in a video image of claim 1, wherein the performance parameters to be compared comprise: a signal-to-noise ratio and a coding rate.

4. The encoding method used by a digital television, new generation mobile communication apparatus, broadband communications network apparatus or family consumer electronics apparatus for skipped macroblocks in a video image of claim 1, wherein the joint coding mode of the number of skipped macroblocks and the macroblock type in step 4 is to process P frame image and B frame image together, add one skip type in macroblock types, determine skip macroblock type position in a macroblock type table by skip macroblock type average appearance probability, and correspondingly adjust the whole macroblock type table; for the skipped macroblocks, to encode them one by one by using the skip type according to their skipped counters and indicating them one by one; for the non-skipped macroblocks, to encode them by using corresponding macroblock types.

5. The encoding method used by a digital television, new generation mobile communication apparatus, broadband communications network apparatus or family consumer electronics apparatus for skipped macroblocks in a video image of claim 1, wherein the joint coding mode of the number of skipped macroblocks and the macroblock type in step 4 is to process P frame image and B frame image respectively; if it is a P frame image, adding a skip type in a former macroblock type table to encode; if it is a B frame image, modifying its former Direct mode coding, the coding mode for each skipped macroblock is to use a Direct mode coding value closely followed by a CBP (Coded Block Pattern) zero coding value, and the coding mode for the non-skipped macroblock is to use a Direct mode coding value closely followed by a CBP non zero coding value.

6. The encoding method used by a digital television, new generation mobile communication apparatus, broadband communications network apparatus or family consumer electronics apparatus for skipped macroblocks in a video image of claim 1, wherein said run_length coding mode or joint coding mode of the number of skipped macroblocks and the macroblock types for skipped macroblocks is adaptive to be performed not only for frame coding but also for field coding.

* * * * *